(12) United States Patent
Borazghi

(10) Patent No.: US 7,429,305 B2
(45) Date of Patent: Sep. 30, 2008

(54) PROCESS AND MACHINE FOR PRODUCING LIGHTWEIGHT THERMOPLASTIC COMPOSITE PRODUCTS IN A CONTINUOUS MANNER

(76) Inventor: Hossein Borazghi, 241, rue Laurier, Ile-Bizard, Quebec (CA) H9C 3A5

( * ) Notice: Subject to any disclaimer, the term of this patent is extended or adjusted under 35 U.S.C. 154(b) by 391 days.

(21) Appl. No.: 11/006,707

(22) Filed: Dec. 8, 2004

(65) Prior Publication Data

US 2006/0118238 A1     Jun. 8, 2006

(51) Int. Cl.
  *C09J 5/00* (2006.01)
(52) U.S. Cl. .................. 156/311; 156/322; 156/510
(58) Field of Classification Search ............... 156/267, 156/311, 322, 199, 200, 510, 279, 461, 359, 156/463, 360, 465, 361; 425/335, 336; 264/280
See application file for complete search history.

(56) References Cited

U.S. PATENT DOCUMENTS 2,547,880 A * 4/1951 Meyer et al. .............. 156/201
3,880,975 A * 4/1975 Lundmark .................. 264/119
4,414,266 A * 11/1983 Archer et al. .............. 156/242
6,401,786 B1 * 6/2002 Tedeschi et al. ............ 156/515
2001/0032696 A1 * 10/2001 Debalme et al. ........... 156/172

* cited by examiner

*Primary Examiner*—Brenda A Lamb
(74) *Attorney, Agent, or Firm*—Ogilvy Renault LLP

(57) ABSTRACT

A machine and a process for producing lightweight thermoplastic composite products in a continuous manner is disclosed. An oven is provided for heating a dry unconsolidated fabric sheet of commingled fibers of thermoplastic and re-enforcing fibers or carbon fibers to a temperature sufficient to ensure melting and flow of the resin in the voids of the commingled fibers. The unconsolidated composite sheet is conveyed through the oven and then through a first pair of heated rollers at an outlet of the oven whereby to maintain the fabric sheet heated to prevent abrupt cooling at the surfaces while compressing it under pressure. A further pair of rollers at a further reduced temperature is provided whereby the heated sheet is gradually lowered in temperature and the pressure is maintained thereon during consolidation of the commingled fibers to ensure complete flow of the resin in the voids between the reinforcing fibers. The continuous composite consolidated sheet can then be processed to sheet form, or laminated in a sandwich, or profiled whereby to form a desired product.

17 Claims, 2 Drawing Sheets

PROCESS AND MACHINE FOR PRODUCING LIGHTWEIGHT THERMOPLASTIC COMPOSITE PRODUCTS IN A CONTINUOUS MANNER

TECHNICAL FIELD

The present invention relates to a machine and a process for the production of lightweight thermoplastic composite products in a continuous manner.

BACKGROUND ART

The uses available from polymer based composite materials has been considerably broadened by the introduction of thermoplastic (TP) matrices. Thermoplastic polymers, in particular semi-crystalline ones, provide a number of significant advantages over their thermosetting counterparts. They exhibit better fraction toughness, there is no need for chemical reaction during processing and therefore no toxicity during processing and application, and they are recyclable.

On the other hand, the high viscosity of the molten thermoplastic resin imposes many limitations on the manufacturing process with these materials. These are usually related to the need of incorporating the highly viscous polymer into the structure made of continuous reinforcing fibers. Use of commingled yarn is one of the most promising approaches for fast production of TP based composites. Commingling of thermoplastic and reinforcement fibers gives a good initial matrix-reinforcement distribution in a non-molten state before processing. This represents a kind of dry impregnation, which circumvents some of the difficulties associated with the high viscosity of the molten polymer.

Fabric woven from commingled yarn can be processed by application of heat and pressure into composite materials in a manner analogous to that of thermoset based prepregs. The relatively uniform commingling of the reinforcing matrix fibers minimizes the distance the molten thermoplastic is required to flow to fill the inter fiber spaces and this allows the material to be consolidated using reasonable pressure even at high fiber content of glass fibers.

Today, compression molding is the most important manufacturing process used for commingled fabrics. When fabric is heated above the melting point of the resin, the thermoplastic fibers melt and flow around the glass fibers under applied pressure and fill the space between them. The initially separated yarn, now consisting of reinforcing fiber bundles and the molten polymer move towards one another, and the polymer flows out of the bundles to fill the free space between them. As the pressure increases the smaller inter-fiber voids are filled leading to a, hopefully, full consolidation (i.e. void free material). When consolidation is finished, the composite material has to be cooled under pressure, down to a temperature where the resin is solid enough to avoid unwanted deformation after demolding. These are the problems encountered in high volume fabrication of TP composite that necessitates use of automated, well controlled, and expensive fabrication process.

SUMMARY OF INVENTION

It is a feature of the present invention to provide a different process and apparatus to produce lightweight thermoplastic composite products but in a continuous manner by the use of a continuous process whereby to lower manufacturing costs and to eliminate the physical restraints of mold and oven dimensions. A continuous process also facilitates the production of desired products either by roll forming at the outlet of the continuous process or the production of sandwich panels or sheets of large dimensions which can be used in the manufacture of walls, roof sections, doors, flooring of train cars, automobiles, shipping containers, only to name a few products where reduced weight is of importance to obtain the benefit of reduced gas consumption and consequently the release of hazardous gas emissions. By roll forming, products can be produced for use in the construction of highway guardrails, which traditionally have been made of corrugated galvanized steel plates and beams. Such is prone to corrosion in harsh environments and resulting in loss of strength, durability and deterioration of its appearance. Such guardrails also damage vehicles and injure passengers and must be replaced after being impacted by a vehicle. By the use of thermoplastic composite materials, a significant weight reduction with excellent fatigue and impact behaviour, especially at low temperature, can be obtained.

Large sandwich panels can also be used in the construction of concrete forms for the construction of high-rise buildings, large construction projects, the rebuilding and renovation of infrastructures, roads, and bridges. Currently, the forms are made of laminated plywood, aluminum or steel sheets and this poses several problems such as heavy weight, corrosion, short life span and high cost and is also labour intensive to manipulate. Traffic sign panels and outdoor advertising panels are other examples of the application of sandwich panels. These materials may find several applications in the transport industry, such as in truck containers, buses, trains, etc.

Any product application, where weight reduction, impact resistance, corrosion resistance and life-cycle costs are issues of concern, will benefit from the structural materials which are designed and manufactured, using thermoplastic composites, and in accordance with the continuous process of the present invention.

According to these features, from a broad aspect, the present invention provides a machine for producing lightweight thermoplastic composite products in a continuous manner. The machine comprises at least one heating oven for heating a dry unconsolidated fabric sheet of commingled fibers of thermoplastic resin and reinforcing fiberglass or carbon fibers to a temperature sufficient to insure melting and flow distribution of the resin in voids of the commingled fibers. This sheet is conveyed through the oven where the fabric sheet is heated up to temperature slightly more than the melting point of the thermoplastic resin, and out of the oven through a first pair of heated rollers with the fabric sheet engaged in a gap between the first pair of heated rollers to maintain pressure. The rollers are heated to a predetermined temperature to avoid abrupt cooling at the surface of the laminate. Further pairs of rollers are provided, and at least one pair of which is operating at a reduced temperature from the first pair and these additional rollers engage the composite sheet in respective gaps whereby to maintain pressure and reduce the temperature of the sheet while controlling the pressure and thickness thereof as the commingled fibers consolidate to form a continuous composite consolidated sheet. At the output of the continuous process, the machine is also provided with processing means for processing the continuous composite consolidated sheet to progressively form a desired product (profile) using forming rollers.

According to a further broad aspect of the present invention there is provided a continuous process for the production of lightweight thermoplastic composite products. The process comprises the steps of feeding on a continuous basis a sheet of dry unconsolidated commingled fibers of thermoplastic resin and reinforcing fiberglass or carbon fibers in an oven to heat the sheet to a temperature sufficient to insure melting and flow of the thermoplastic resin fibers. The sheet is then subjected to further controlled heat and pressure by feeding the sheet from the oven through a gap between a first pair of heated rollers. The rollers are heated to a predetermined temperature and the sheet is compressed in the gap. The sheet is then fed through further pairs of rollers, at least one pair of which is a pair of heated rollers operating at a reduced temperature from the first pair of heated rollers to reduce the temperature of the sheet and further maintain the sheet under pressure to ensure full distribution of the resin and to obtain a desired sheet thickness while causing the commingled fibers to consolidate to thereby form a continuous composite consolidated sheet. The temperature of the oven, of the heated rollers, and the feed speed of the sheet are all controlled by a computer controller. The sheet is then processed progressively to form a desired product by using forming rollers.

BRIEF DESCRIPTION OF DRAWINGS

A preferred embodiment of the present invention will now be described with reference to the accompanying drawings in which.

DESCRIPTION OF PREFERRED EMBODIMENTS

Figure 1:
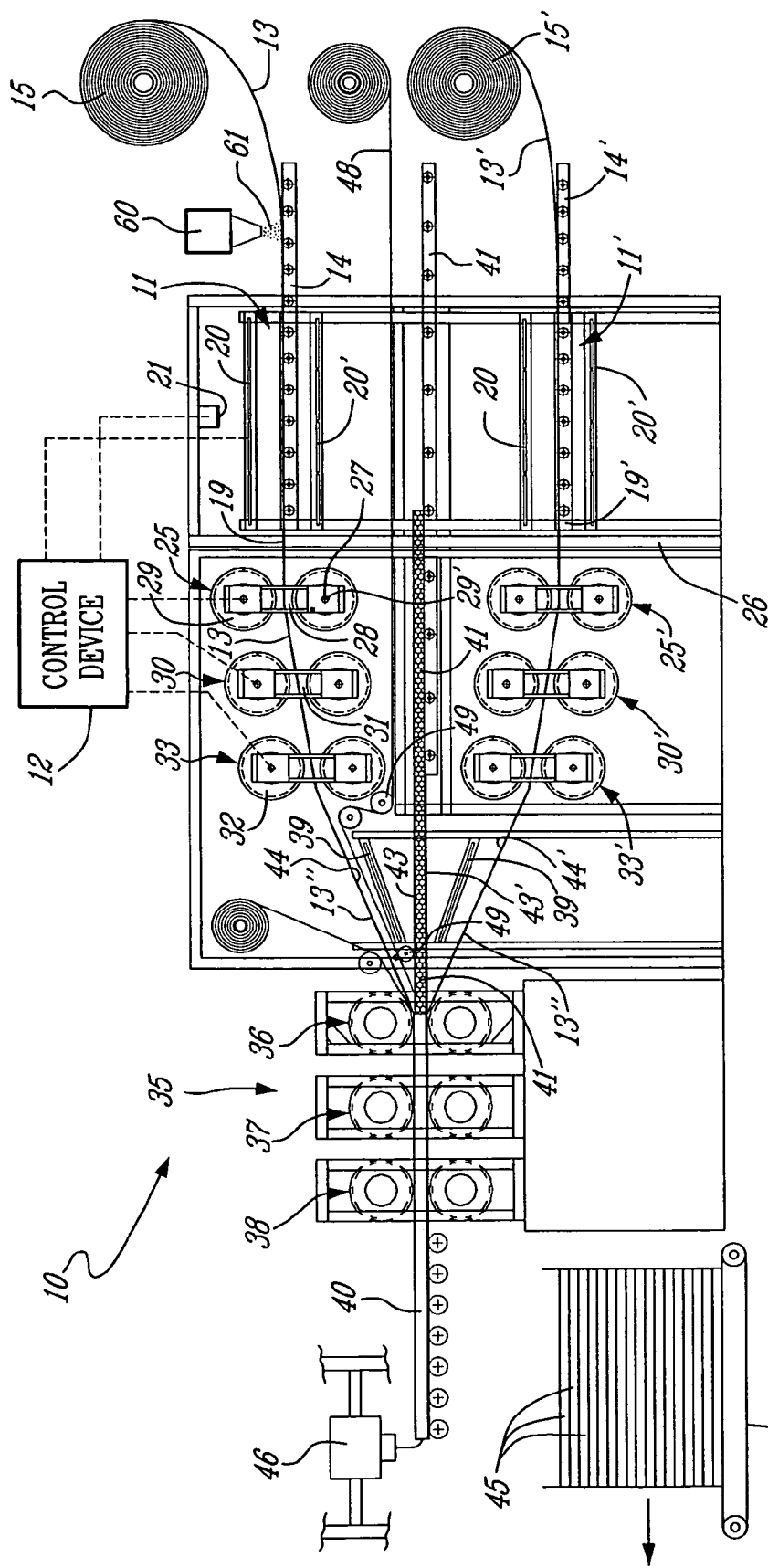
FIG. 1 is a simplified side view illustrating the machine and process of the present invention for the production of lightweight thermoplastic composite material and products in a continuous manner.
Figure 3:
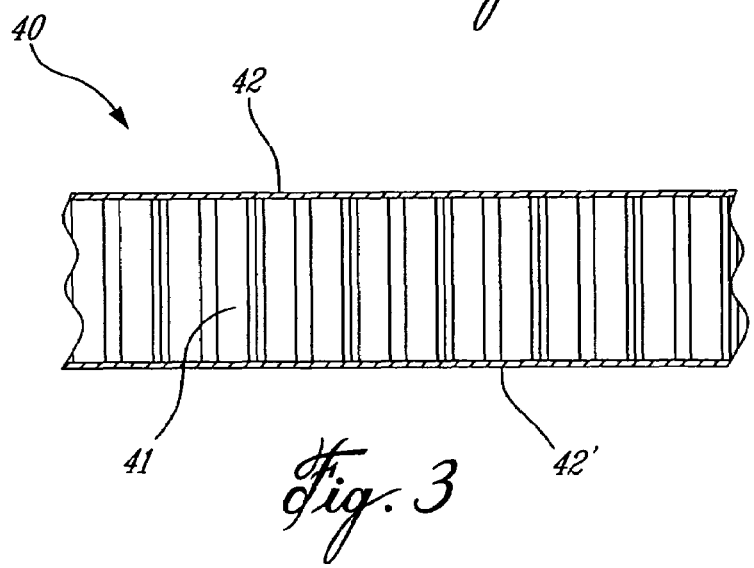
FIG. 3 is a view similar to FIG. 2, but illustrating a sandwich panel constructed by the machine and process of the present invention and comprised of a center core material sandwiched between opposed composite consolidated sheets fabricated by the machine and process of the present invention.

Referring now to the drawings and more particularly to FIG. 1, there is illustrated at 10 the machine of the present invention for the production of lightweight thermoplastic composite products in a continuous manner. The machine comprises at least one heating oven 11 and there is herein illustrated two such ovens 11 and 11' when fabricating a sandwich product 40 as illustrated in FIG. 3. A controller device 12 controls the temperature of the ovens 11 and 11'. Dry unconsolidated commingled fabrics 13 and 13' are fed to their respective ovens 11 and 11' by suitable feed means. As hereinshown, the commingled fabric sheets 13 and 13' are guided in their respective ovens 11 and 11' on roller conveyors 14 and 14', respectively. Such fabric 13 and 13' may be unwound from supply rolls 15 and 15', respectively. It may also be provided in very long sheet form.

Figure 2:
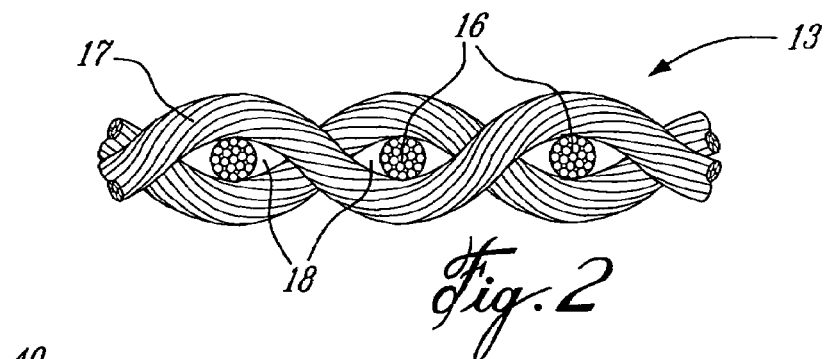
FIG. 2 is a cross-section view illustrating the unconsolidated composite fabric sheet comprised of commingled fibers.

As shown in FIG. 2, the fabric sheets 13 and 13' are comprised of dry unconsolidated commingled fibers of thermoplastic resin 16 and reinforcing fibers 17 of fiberglass material or carbon material. The fabric sheets 13 and 13' are conveyed through the oven and through the system by drive rollers as will be described later and controlled by the controller device 12. The controller device 12 also controls the temperature of the ovens 11 and 11' whereby to heat the fabrics to a temperature sufficient to ensure melting of the thermoplastic resin for it to start flowing between the fibers 17. The thermoplastic resin may be, for example, polypropylene, PET or polyamide fibers and they can be of different types or thicknesses. For polypropylene, the exit temperature from the oven would be higher than the melting point of this resin and therefore above 168° C. and preferably about 178° C. This ensures that the polypropylene has melted and starts flowing in the voids between the reinforcing fibers 16 and 17, as illustrated in FIG. 2. Accordingly, the fabric sheets 13 and 13' exit their ovens at the outlet 19 and 19' thereof with the thermoplastic resin in molten form. The temperature of the ovens is maintained substantially constant by controlling two parallel blocks 20 and 20' of infrared elements. Temperature sensors such as schematically illustrated at 21 provide signals to the controller device 12 to monitor the temperature of each oven and to control the infrared heaters. The controller 12 also controls the feed speed of the fabric sheet 13 being conveyed through the oven.

The machine 10 as herein illustrated was constructed to fabricate sandwich panels such as illustrated in FIG. 3 which is composed of a non-structural core 41 to which is fused two outer composite consolidated sheets 42 and 42' having been processed in the machine 10. The core material 41 can be an aluminum or polypropylene prefabricated honeycomb core, as illustrated at 41, or a rigid foam sheet or any suitable material. The core material should be a lightweight material capable of supporting shear and compressive stresses and providing good adhesion to the composite consolidated sheets 13". Seeing that the continuous composite consolidated sheets 13" are formed by identical equipment on opposed sides of the core sheet 41, only one side of the apparatus and process will follow. As shown in FIG. 1, the core material 41 is fed directly between the ovens 11 and 11' in a substantially horizontal plane and on opposed sides thereof the composite consolidated sheets 42 are formed.

As illustrated, the machine and process consist of several stages of fabrication which are completely independent but related in a progressive manner. The purpose of the machine and process is to heat and consolidate the commingled fibers in the fabric and then laminate it on opposed sides of the core material 41. This continuous process and apparatus can achieve high volume of production and quality composite parts. The process offers significant advantages over conventional processing technologies as above-described. Some advantages include a short fabrication cycle, an unlimited length for products and mixed-processing possibilities, such as the construction of sandwich products or shaped products (profiles) are important advantages of this technology.

At the outlet 19 of the ovens, the fabric sheet 13 exits with the resin in a molten state and this sheet is immediately fed between a first pair of heated rollers 25 which are mounted on a support frame 26 which is provided with adjustments 27 whereby to adjust the gap 28 and therefore pressure between the rollers. Accordingly, the fabric sheet 13 is placed under pressure in this gap to squeeze the resin in the voids between the fibers. The rollers 29 and 29' of the first pair of heated rollers 25 also has the temperature thereof controlled by the controller device 12 whereby to maintain the sheet at a desired temperature and under pressure whereby to ensure consolidation of the molten resin with the reinforcing fibers and to achieve a composite consolidated sheet of predetermined thickness. The temperature of the first pair of heated rollers 25 and 25' is controlled within the range of about 60 to 120° C. thereby controlling the cooling rate of the fabric sheet 13.

The fabric sheet 13 exiting the first pair of heated rollers 25 is then subjected to a second pair of heated rollers 30 which are also mounted on adjustments to control the size of its gap 31. The temperature of the second set of heated rollers 30 is also controlled by the controller device 12 and maintained at a temperature which is lower than the first set of rollers 25 and preferably about 25° C. lower. Accordingly, the temperature of the fabric sheet 13 is gradually decreased while maintained under pressure by these two pairs of rollers.

A still further pair of rollers 33 engages the fabric sheet 13 and its rollers 32 and 32' are also adjustable to maintain the fabric sheet 13 under pressure. This further set of rollers 33 are not heated and operate at ambient temperature. At this stage in the process the fabric sheet 13 has now consolidated and it is now fed to processing devices 35 to form desired products. It is pointed out that the fabric sheet 13 is conveyed through the apparatus by the pairs of rollers 25, 30 and 33 which are driven in synchronism. Such drives are well known in the art. Also, the pairs of rollers 36, 37 and 38 as illustrated in the processing device 35 may also be driven and also in synchronism. All of these rollers are controlled by the controller device 12.

As hereinshown the apparatus is structured to form sandwich panels the cross-section of which is illustrated at 40 in FIG. 3. In order to do so, there is further provided three pairs of rollers 36, 37 and 38 which maintain pressure on the sandwich which is formed thereunder to ensure that the composite consolidated sheet 13" fed on opposed sides of the core 41 are well bonded thereto. In order to achieve this bond, the outer faces 43 and 43' of the core sheet 41 are heated by infrared heaters 39 and 39'. These infrared heaters also provide radiant heat, in the order of about 160° C., to the inside surfaces or bonding surfaces 44 and 44' of the composite consolidated sheets 13", respectively. This melts the thermoplastic resin on the surfaces thereof which are to be bonded to the outer surfaces of the core sheet 41. The panels may have a thickness of from about 5 mm to about 50 mm. The sets of rolls 36, 37 and 38 are adjusted to maintain pressure on this sheet as it cools to rigidly bond to the core material thus producing at its outlet a continuous sheet which can then be cut into sheet sections 45 by a slitter device 46 which moves with the sandwich sheet 40 to cut the sheet transversely thereacross to form individual structural sheets or panels 45 which can then be stacked, as hereinshown on a conveyor means 47 and then automatically transported. The slitter 46 is also controlled by the controller device which can adjust the size of the sheets down to narrow panels.

If the core material 41 is constructed of light aluminum or light wood product, then in order to fuse the composite consolidated sheets 13" thereto, there may be interposed between the consolidated sheets and the outer surfaces of the core sheet 41 a binder sheet 48 guided over the infrared heaters 39 by guide rolls 49 to adhere the composite consolidated sheets 13' to opposed surfaces of the core material. If it is desirable to embed a color effect on the opposed faces of the sandwich product 40, then a plastic colored film sheet 50 may be fed over the top surface of the upper composite consolidated sheet 13" as herein illustrated. This sheet would adhere to the top face of the thermoplastic material which is heated and bind thereto by the hot thermoplastic material.

Figure 4:
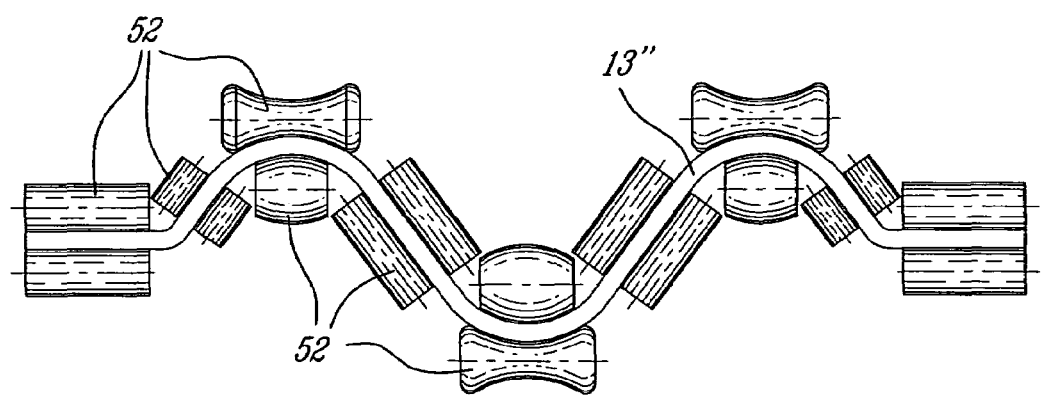
FIG. 4 illustrates the construction of a guardrail profile formed at the outlet end of the machine by forming rollers.

It is pointed out that although the machine as herein illustrated is to construct the sandwich panel product 40 as illustrated in FIG. 3, the machine can operate with simply the upper part thereof with a single oven and sets of rolls 25, 30 and 33 whereby to produce a single composite consolidated sheet 13" which is then processed by the processing device 35 which may consist of sets of forming rolls 52 as illustrated in FIG. 4 whereby to shape the continuous composite consolidated sheet 13" as illustrated in FIG. 4 to form a desired profile. As hereinshown the profile being formed is that for use in the construction of guardrails and many of these wave shapes can be formed across the sheet and then cut into long strip sections of shaped products. These forming rolls 52 would progressively shape the sheet which is still hot and malleable prior to complete cooling thereof. These shaped sheets could also be cut by the device 46. The cutter device 46 can have various forms and could be a laser cutting machine or other suitable cutter devices.

As above pointed out, the conveying means consist of the pairs of rollers 25, 30, 33 and also rollers 36, 37, 38 if provided. These rolls are connected to variable speed drive motors, not shown, but obvious to a person skilled in the art and which are automatically controlled by the controller device whereby to adjust the feed speed of the fabric sheet to ensure full consolidation. Also, the adjustment of the gaps between these rollers can be adjusted mechanically or automatically.

Summarizing now the continuous process for the production of lightweight thermoplastic composite products, it comprises the steps of feeding on a continuous basis the sheet 13 of the dry unconsolidated commingled fibers of thermoplastic resin and reinforcing fiberglass or carbon fibers through various controlled process stages. The first stage comprises an oven 11 to heat the sheet to a temperature sufficient to ensure the melting of the thermoplastic resin fibers. The sheet 13 is then subjected to further controlled heat and pressure treatment by a first pair of heated rollers 25 which have the gap thereof adjusted depending on the thickness of fabric sheet 13 fed to rollers to squeeze the resin within the voids between the reinforcing fibers. The speed is also controlled in accordance with the characteristics of that sheet. The rollers 25 are heated to a predetermined temperature, whereby the temperature of the heated sheet can be controlled and compressed between the rolls to ensure full consolidation of the resin with the structural fibers. The sheet is also fed through a second set of heated rollers which maintain the sheet at a reduced temperature and continuously under pressure to assure that the resin flows into the interstices of the fibers in the fabric sheet and full consolidation. The last set of rollers 33 operate at ambient temperature and at that stage the fabric sheet 13 has almost fully consolidated and it is now ready to be treated in the processing device to fabricate desired products as above-described. As shown in FIG. 1, it is also envisaged that a color may be imparted to at least one face of the composite consolidated sheet. As hereinshown, a hopper 60 is provided at the inlet of the top oven 20 whereby to deposit on the unconsolidated fabric sheet 13 a colored plastic powder material 61 which will melt in the oven and flow in the sheet to provide a color effect at the surface of the top consolidated sheet 13". However, this hopper 60 may be installed after the oven or at any other stages between the consolidation rollers depending on the type of powder and application.

It is also within the ambit of the present invention to cover any other obvious modifications provided such modifications fall within the scope of the appended claims.

I claim:

1. A machine for producing lightweight thermoplastic composite products in a continuous manner, said machine comprising at least one heating oven for heating a dry fabric sheet of commingled fibers of thermoplastic resin and reinforcing fiberglass or carbon fibers to a temperature slightly more than the melting point of said resin to insure melting and flow of said resin in voids of said commingled fibers, conveying means to feed said fabric sheet through said oven, a first pair of heated rollers at an outlet of said oven with said fabric sheet engaged in a gap between said first pair of heated rollers to maintain pressure, said rollers being heated to a predetermined temperature to avoid abrupt cooling at surfaces of said fabric sheet; further pairs of rollers, at least one pair of which is operating at reduced temperature from said first pair and engaging said fabric sheet in respective gaps whereby to maintain pressure and reduce the temperature of said sheet and control the pressure and thickness thereof as said commingled fibers consolidate to form a continuous composite consolidated sheet, at least one of said first and further pairs of rollers are drive rollers, said at least one of said first and further pairs of rollers being driven in controlled synchronism with said continuous composite sheet in engagement between said drive rollers; and a controller device for controlling the speed of said continuous composite sheet, the gap of all of said pairs of rolls, the temperature of said heating oven and said heated rollers, and for monitoring temperature of said composite sheet at different stages.

2. A machine as claimed in claim 1 wherein said fabric sheet is an unconsolidated fabric sheet, and wherein there is further provided sheet processing means for processing said continuous composite consolidated sheet to form said lightweight thermoplastic composite product.

3. A machine as claimed in claim 2 wherein there is further provided after said sheet processing means a cutting mechanism to slit said continuous composite consolidated sheet to form said composite products from said continuous composite consolidated sheet.

4. A machine as claimed in claim 3 wherein said unconsolidated fabric sheet processing means are pairs of forming rolls mounted in succession whereby to progressively shape said continuous composite consolidated sheet to a desired profile at a formable temperature.

5. A machine as claimed in claim 2 wherein said first pair of heater rollers and said further pair of rollers are adjustable rolls having an adjustable gap therebetween to apply pressure on said fabric sheet and through which there is conveyed a backing sheet material to be adhered to said continuous composite consolidated sheet by said pressure rolls.

6. A machine as claimed in claim 5 wherein said continuous composite consolidated sheet is re-heated to a temperature sufficient to permit adherence to said backing sheet material by molten thermoplastic material in said composite consolidated sheet.

7. A machine as claimed in claim 6 wherein a plastic colored film sheet is fed on a top and/or bottom face of said continuous composite consolidated sheet which has been reheated and fed through said pressure rolls to adhere to said top face by said molten thermoplastic material to embed a color effect to said top face thereof.

8. A machine as claimed in claim 5 wherein a binder sheet is heated and interposed between said composite consolidated sheet and said backing sheet to bond them together under pressure from said pressure rolls.

9. A machine as claimed in claim 2 wherein said lightweight thermoplastic composite product is a sandwich panel formed by a sheet of core material and to which one of said fabric sheets is bonded on a respective one of opposed surfaces of said core material.

10. A machine as claimed in claim 9 wherein there are two of said dry unconsolidated fabric sheets of commingled fibers each fed to a respective heating oven and respective first and further pairs of said heated rollers, said sheet of core material being drawn between said two of said fabric sheets by said conveying means to form said sandwich panel which is a sandwich laminated sheet, said conveying means being at least one pair of pressure rolls between which said sandwich laminated sheet is conveyed with said fabric sheets having its thermoplastic material in molten form acting as an adhesive with respective ones of opposed faces of said sheet of core material.

11. A machine as claimed in claim 10 wherein there is further provided radiant heating means to heat said opposed surfaces of said sheet of core material and facing surfaces of said two continuous composite consolidated sheets prior to being fed between said at least one pair of pressure rolls.

12. A machine as claimed in claim 11 wherein said core material is a light material capable of supporting shear and compressive stresses and providing good adhesion to said composite consolidated sheets.

13. A machine as claimed in claim 12 wherein said core material is a polypropylene honeycomb sheet material or an aluminum honeycomb or any other similar core.

14. A machine as claimed in claim 11 wherein said heating means is a radiant heater disposed on opposed sides of said core material to reheat said facing surfaces of said consolidated sheets to a temperature of about 160° C.

15. A machine as claimed in claim 11 wherein there are at least three pairs of spaced-apart pressure rolls to compress said composite consolidated sheets on said opposed surfaces of said core material to ensure full adherence.

16. A machine as claimed in claim 9 wherein said sandwich panel has a thickness in the range of from about 5 mm to about 50 mm.

17. A machine as claimed in claim 1 wherein at least some of said rolls of said conveying means being variable speed rolls which are controlled by said controller device to adjust the feed speed of said unconsolidated composite sheet.

* * * * *